United States Patent [19]

LaCroix

[11] 4,337,615
[45] Jul. 6, 1982

[54] GAS TURBINE FUEL CONTROL SYSTEM

[75] Inventor: Stephen R. LaCroix, Scottsdale, Ariz.

[73] Assignee: The Garrett Corporation, Los Angeles, Calif.

[21] Appl. No.: 22,532

[22] Filed: Mar. 21, 1979

[51] Int. Cl.³ .............................................. F02C 9/32
[52] U.S. Cl. ........................... 60/39.14 R; 60/39.28 R
[58] Field of Search ................... 60/39.14 R, 39.28 R

[56] References Cited

U.S. PATENT DOCUMENTS

| 3,288,160 | 11/1966 | Eggenberger . | |
|---|---|---|---|
| 3,340,883 | 9/1967 | Peternel . | |
| 3,452,258 | 6/1969 | Thompson . | |
| 3,748,491 | 7/1973 | Barrigher et al. . | |
| 3,757,130 | 9/1973 | Uchiyama et al. . | |
| 3,834,830 | 9/1974 | Johncock . | |
| 3,981,608 | 9/1976 | Sato . | |
| 4,044,551 | 8/1977 | Nelson et al. | 60/39.14 R |
| 4,044,554 | 8/1977 | West | 60/39.28 R |
| 4,122,667 | 10/1978 | Hosaka et al. | 60/39.14 R |
| 4,218,878 | 8/1980 | Kiscaden et al. | 60/39.14 R |

Primary Examiner—Robert E. Garrett
Attorney, Agent, or Firm—Fay I. Konzem; John H. Lynn; Albert J. Miller

[57] ABSTRACT

An electronic fuel control system for varying the fuel flow to a gas turbine engine during the engine's acceleration. The reference speed set point of the engine's fuel controlling governor is increased as a function of the elapsed time from engine start-up and the engine characteristics so that the engine accelerates substantially along its "required to run line."

29 Claims, 3 Drawing Figures

GAS TURBINE FUEL CONTROL SYSTEM

BACKGROUND OF THE INVENTION

This invention relates to fuel control systems, and more particularly to fuel control systems having electronics for controlling the amount of fuel delivered to the gas turbine engine as a function of elapsed time.

Prior art turbines have attempted to design fuel control systems so that the rate of the engine acceleration closely approaches but does not reach a maximum fuel schedule line (plotted as fuel flow rate vs. speed) so that maximum acceleration of the engine can be obtained without overheating or causing damage to the engine. Prior art fuel control systems monitor various engine parameters, such as temperature, pressure, and fuel flow, controlling the fuel flow and the rate of acceleration in relation to these parameters. The problem with these prior art fuel control systems is the difficulty in obtaining accurate measurements of such parameters as the temperature, pressure and viscous drags.

The present invention overcomes these disadvantages by providing a fuel control system which electronically controls the amount of fuel flow to the engine as a function of the elapsed time from the engine start-up to deliver the optimum fuel flow to the engine.

SUMMARY OF THE INVENTION

The fuel control system of the present invention includes a timer for increasing the rate of fuel flow to the gas turbine engine as a function of elapsed time from engine start-up. The system further includes a hung start detector which senses when the rate of fuel flow is too great for the engine speed, and means for inhibiting the timer to allow the engine speed to catch up to the rate of fuel flow.

DETAILED DESCRIPTION OF THE PREFERRED EMBODIMENT

Figure 1:
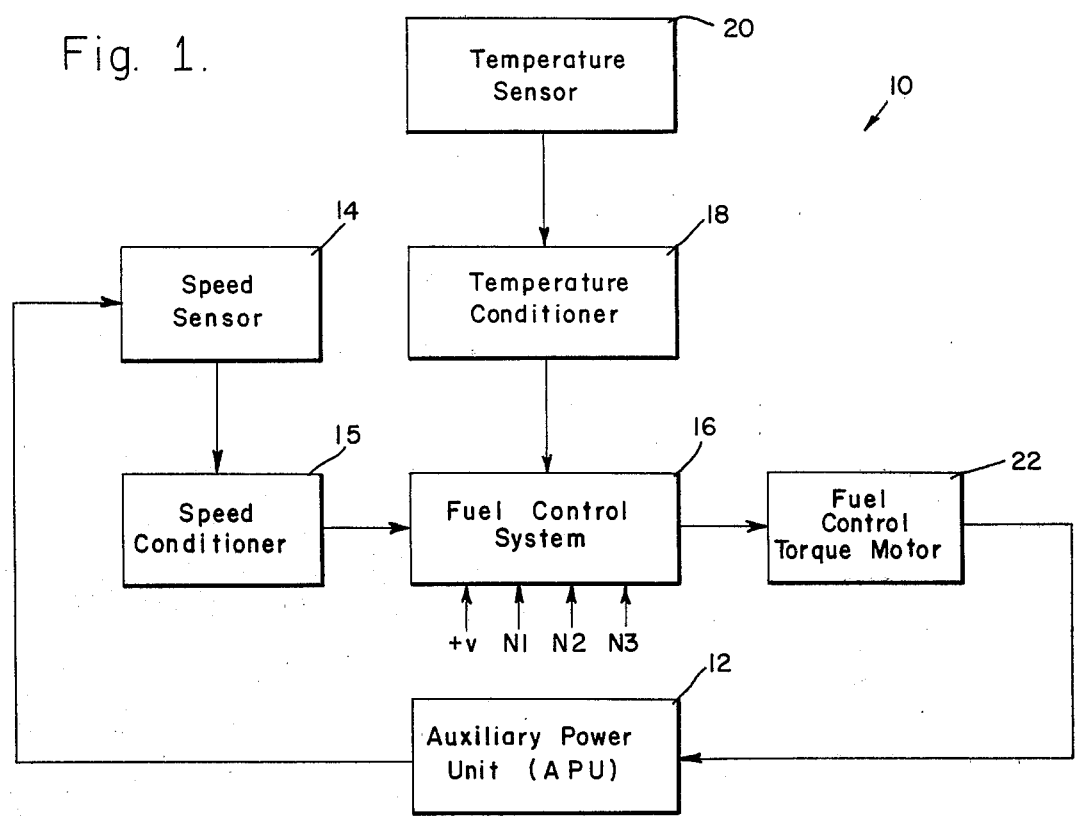
FIG. 1 is a block diagram of the fuel control and power system constructed in accordance with the principles of the present invention.

A power system 10 of a turbine engine as shown in FIG. 1 includes an auxiliary power unit (APU) 12, coupled to a speed sensor 14, for sensing the turbine engine's speed. The speed sensor 14 is in turn coupled through a speed conditioner 15 to the fuel control system 16 of the present invention. The speed conditioner 15 converts the A.C. signal from the speed sensor 14 to a D.C. signal to be delivered to the fuel control system 16. A reference voltage, +V, three reference speeds, namely, N1, N2 and N3 are coupled to the fuel control system 16, along with a temperature conditioner 18 which amplifies the signal from a temperature sensor 20, which indicates the engine temperature. Finally, the output of the fuel control system 16 is coupled through a fuel control torque motor 22 back to the APU 12. The fuel control system 16 monitors the engine speed and temperature and regulates the fuel control torque motor 22 to deliver the optimum amount of fuel flow to the APU 12.

Figure 2:
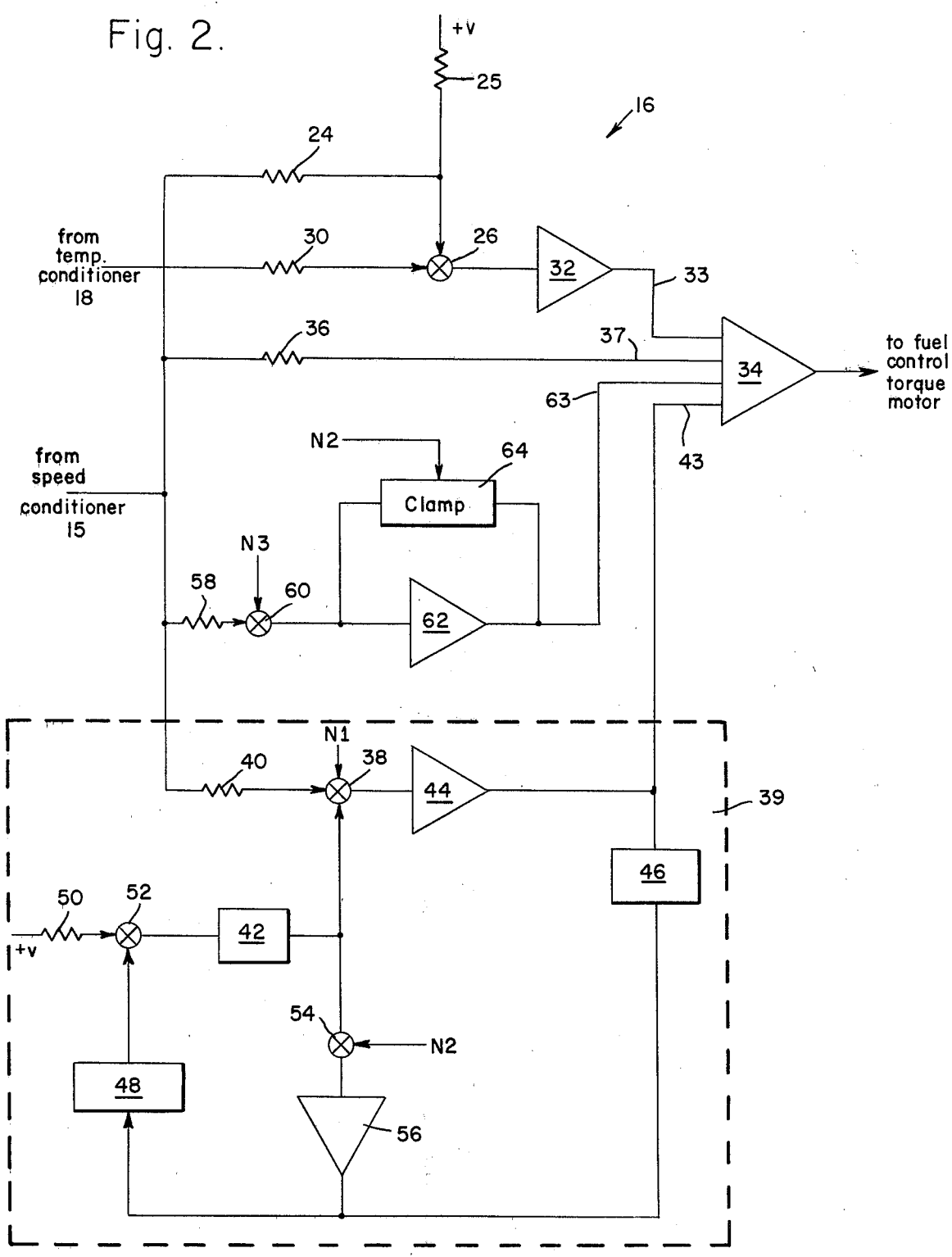
FIG. 2 is a schematic of the fuel control system of the present invention.

FIG. 2 illustrates the fuel control system 16 in detail. The speed signal from the speed conditioner 15 is delivered through a resistor 24 to a summing junction 26, and a reference voltage (+V) is delivered to summing junction 26 through a resistor 25. The signal from the temperature conditioner 18 is delivered through a resistor 30 to the summing junction 26, which sums the two signals and sends the summed signal through an amplifier 32 to a first input 33 of a summing amplifier 34. The speed signal from the speed conditioner 15 is delivered through a resistor 36 to a second input 37 to the summing amplifier 34.

A timer-hung start detector section 39 controls the amount of fuel to the turbine engine between the reference speeds N1 and N2. The hung-start detector section 39 includes a summing junction 38 which receives the speed signal through a resistor 40, the speed reference signal N1, and the output signal from a timer 42. The summed signal from junction 38 is coupled to a third input 43 to the summing amplifier 34 through an amplifier 44. The output of the amplifier 44 is connected to a hung start detector 46, which is connected to a device 48 for inhibiting the timer 42. The hung start detector 46 sends a signal to activate the inhibiting device 48 and thereby inhibit the timer 42 when the speed deviates from the required to run line. The reference voltage (+V) is delivered through a resistor 50 to a summing junction 52. The junction 52 sums the reference signal +V and the signal from the inhibiting device 48, and this summed signal is coupled to and inhibits the timer 42. When the inhibiting device 48 is activated by the hung start detector 46, the timer 42 can consist of a timing device such as an operational amplifier with an integrator feedback loop; the hung start detector 46 also can consist of an operational amplifier; and the inhibiting device 48 can consist of a device such as a current limiting resistor.

A summing junction 54 sums the signal from the timer 42 and a second reference speed signal N2, so that when the signal from the timer 42 is equal to the reference signal N2, an error signal is amplified by an amplifier 56 and delivered to the inhibiting device 48 to activate it and thereby inhibit the timer 42.

The speed signal from the speed conditioner 15 is delivered through a resistor 58 to a summing junction 60. A third reference speed signal N3 is also summed by the junction 60 whose summed signal passes through and is amplified by an amplifier 62 into a fourth input 63 to the summing amplifier 34. A clamp 64 is coupled between the input and output of the amplifier 62. The second speed reference signal N2 is also connected to the clamp 64 so that the clamp 64 holds the amplifier 62 at a zero error signal until the speed reaches the reference speed N2.

Figure 3:
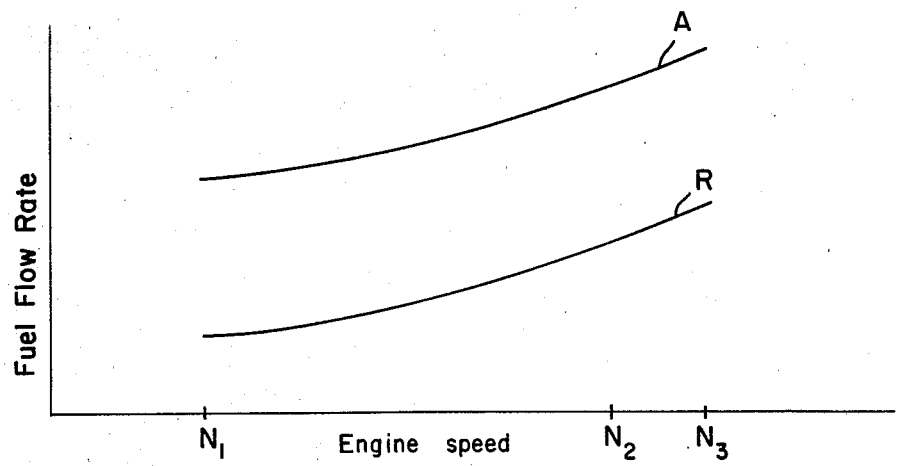
FIG. 3 is a graphical representation of a typical fuel flow rate versus engine speed.

In operation, the present invention can be better understood by reference to FIG. 3 which provides a plot of the engine fuel flow rate versus the engine speed. The line "A" represents an illustrated maximum fuel schedule line which indicates the maximum rate of fuel flow for a given engine speed allowable without overheating or causing damage to the engine. Therefore, the engine must operate under the line "A". The line "R" represents the required to run line of the engine, which is indicative of the minimum amount of fuel flow required to maintain the engine at a certain speed. The fuel control system 16 of the present invention causes the gas turbine engine to accelerate along the required to run line regardless of changes in the engine parameters, such as temperature, pressure or load.

In operation, an external power source such as an electric motor is used to start up the gas turbine engine and the engine speed begins to increase. The speed sensor 14 senses the engine speed, and the signal indicating the speed is sent through the resistor 36 to the summing amplifier 34. The current through line represents the engine speed; and as the engine speed increases, the current output of summing amplifier 34 increases, thereby increasing the rate of fuel flow to the engine.

Upon engine start-up the engine temperature is monitored. The summing junction 26 sums the signal indicative of engine temperature from the temperature sensor 20 and the signal indicative of the engine speed from the speed sensor 14. If the temperature is too high for the particular speed, the error signal from the summing junction 26 will decrease the rate of fuel flow to the engine, thereby reducing the engine temperature.

Once the engine has reached the reference speed N1, the timer-hung start detector section 39 increases the rate of fuel flow to the engine as a function of elapsed time from engine start up. If, because of changes in loads and variations in other parameters, the rate of fuel flow to the engine becomes too great for the engine speed the timer (which controls the increase in the rate of fuel flow) must be inhibited until the engine's speed is allowed time to catch up. When the rate of fuel flow does exceed the maximum fuel schedule (line "A") of FIG. 3 which is called a "hung start," the hung start detector 46 causes the timer 42 to be inhibited, thereby preventing the rate of fuel flow from increasing until the engine speed catches up to the particular rate of fuel flow on the maximum fuel schedule line "A".

From the engine start-up until the engine reaches the reference speed N1 only the first and second inputs 33 and 37 respectively, to the summing amplifier 34 are operative. When the engine reaches the speed N1, the timer-hung-start detector section 39 of the fuel control system 16 is activated.

The reference voltage +V causes a reference current to pass through the resistor 50 to the summing junction 52 to be summed with the signal from the inhibiting means 48. When the signal from the inhibiting means exceeds the reference current, the junction 52 produces an error signal which inhibits the timer 42.

The signal from the timer 42 is summed with the first reference speed signal N1 and with the speed signal at the summing junction 38; and when the speed is equal to or greater than the reference speed N1, the timer 42 runs and the speed is increased with elapsed time. If the output current from the timer is greater than the current from the speed sensor, an error signal from the summing junction 38 decreases the amount of fuel to the engine.

When the timer current (or output) exceeds the sum of the first reference speed signal or current (N1) and the speed signal, an error signal is delivered from the summing junction 38 causing the hung start detector 46 to activate the inhibiting means 48 and thereby inhibit the timer 42. This means that too much fuel is being delivered to the engine for the speed that the engine is presently at so the timer 42 is inhibited, thereby giving the engine speed time to catch up.

Referring to FIGS. 2 and 3, the current through input 37 to summing amplifier 34 controls the rate of fuel flow from engine start-up (a zero speed) until the reference speed N1 is reached; as the speed increases, the amount of fuel to the engine likewise increases.

When more time has elapsed and the engine speed has increased to the reference speed N1, the timer-hung start section 39 is activated and controls the rate of fuel flow until the engine reaches the reference speed N2. Between the reference speeds of N1 and N2 the timer-hung start section 39 generates a proportional error signal when the system does not follow the maximum fuel line "A".

After still more time has elapsed and the engine has reached the reference speed N2, the section of the fuel control system containing the summing junction 60, the amplifier 62 and the clamp 64 operate. The clamp 64 holds the error signal from the junction 60 at zero until the engine reaches the reference speed N2. Due to the excess torque available at these higher speeds, the fuel flow can be increased at a higher rate (greater engine acceleration) and still retain low turbine temperatures between the reference speeds N2 and N3. Reference speed N3 represents the maximum desired speed so the rate of fuel flow is regulated to prevent the speed from exceeding N3.

Although the device which has just been described appears to afford the greatest advantages for implementing the invention, it will be understood that various modifications can be made thereto without going beyond the scope of the invention, it being possible to replace certain elements by other elements capable of fulfilling the same technical functions therein.

What is claimed is:

1. A system for controlling fuel flow in a gas turbine engine, comprising:
    timing means for generating a time signal indicative of the elapsed time from engine start-up;
    means for sensing engine speed;
    means responsive to said timing means and to the sensed engine speed for scheduling a rate of fuel flow as a function of the time signal;
    means for producing an error signal when the rate of fuel flow to the gas turbine engine exceeds a predetermined rate for the sensed engine speed; and
    means for inhibiting said timing means in response to said error signal to maintain the fuel flow rate to said predetermined schedule corresponding to the sensed engine speed.

2. A fuel control system as recited in claim 1, wherein said timing means comprises an operational amplifier with an integrator feedback loop.

3. A fuel control system as recited in claim 1, wherein said means for inhibiting said timing means comprises a current limiting device.

4. A fuel control system as recited in claim 1, further including means for decreasing the rate of fuel flow when the engine temperature exceeds a predetermined value.

5. A fuel control system as recited in claim 1, further including means for increasing the rate of fuel flow as the engine speed increases.

6. A fuel control system for scheduling fuel flow to a gas turbine engine, comprising:
    time generating means for generating a signal indicative of the elapsed time from engine start-up;
    means responsive to said time generating means for increasing the engine speed in relation to said signal; and
    means for maintaining a predetermined schedule of the rate of fuel flow in relation to the gas turbine engine speed.

7. A fuel control system as recited in claim 6, wherein said time generating means comprises an operational amplifier with an integrator feedback loop.

8. A fuel control system as recited in claim 6, wherein said means for inhibiting said time generating means comprises a current limiting device.

9. A fuel control system as recited in claim 6, further including means for decreasing the rate of fuel flow when the engine temperature exceeds a predetermined value.

10. A fuel control system as recited in claim 6, further including means for increasing the rate of fuel flow as the engine speed increases.

11. In a fuel control system for a gas turbine engine having means for generating a turbine inlet temperature signal, means for generating a turbine speed signal, a plurality of reference speed signals and a reference voltage; and means for producing a fuel control signal comprising:
- a summing amplifier having a plurality of inputs and an output;
- means for comparing the temperature signal with the speed signal to produce a first error signal coupled to a first input to said summing amplifier;
- a second input to said summing amplifier coupled to the speed signal;
- means for comparing the speed signal with a first speed reference signal (N1);
- timing means for generating the elapsed time for the engine start-up;
- means for comparing the signal from said timing means and a second speed reference signal (N2) to produce a third error signal, which is coupled to a third input to said summing amplifier;
- a hung start detector having an input and an output, said input coupled to said third input to said summing amplifier;
- means for inhibiting said timing means coupled to the output of said hung start detector and to the means for comparing the signal from said timing means and the second speed reference signal;
- means for comparing the signal from said means for inhibiting and a reference voltage to produce a fourth error signal to be delivered to said timing means.

12. A fuel control system as recited in claim 11, wherein said timing means comprises an operational amplifier with an integrator feedback loop.

13. A fuel control system as recited in claim 11, wherein said means for inhibiting said timing means comprises a current limiting device.

14. A fuel control system as recited in claim 11, wherein said hung start detector comprises an operational amplifier.

15. A fuel control system as recited in claim 11, wherein said means for inhibiting comprises a current limiting device.

16. In a fuel control system for a gas turbine engine having means for generating a turbine inlet temperature signal, means for generating a turbine speed signal, a plurality of reference speed signals and a reference voltage, means for producing a fuel control signal comprising:
- a summing amplifier having a plurality of inputs and an output;
- means for comparing the turbine inlet temperature signal with the turbine speed signal to produce a first error signal coupled to a first input to said summing amplifier;
- a second input to said summing amplifier coupled to the turbine speed signal;
- means for comparing the turbine speed signal with a first speed reference signal;
- timing means for generating a signal indicative of the elapsed time from engine start-up;
- means for comparing the signal from said timing means with a second speed reference signal to produce a second error signal, said second error signal being coupled to a second input to said summing amplifier;
- a hung start detector having an input and an output, said input being coupled to said second input of said summing amplifier;
- means for inhibiting said timing means coupled to the output of said hung start detector and to the means for comparing the signal from said timing means with the second speed reference signal;
- means for comparing the signal from said means for inhibiting with a reference voltage to produce a third error signal to be delivered to said timing means;
- means for comparing a third speed reference signal and the turbine speed signal to produce a fourth error signal;
- amplifier means for amplifying the fourth error signal, said amplifier means having an input for receiving the fourth error signal and an output connected to a fourth input to said summing amplifier; and
- clamping means coupled between said input and said output of said amplifier for causing said amplifier to have a null signal output until the turbine speed equals the second reference speed.

17. A fuel control system as recited in claim 16 wherein said clamping means comprises a field effect transistor.

18. A method of controlling the fuel flow rate to a gas turbine engine, comprising the steps of:
- sensing the engine speed;
- sensing the amount of time elapsed from the engine start-up;
- increasing the rate of fuel flow to the engine in relation to the amount of time elapsed from engine start-up;
- preventing the rate of fuel flow to the engine from increasing when the rate of fuel flow to the gas turbine engine exceeds a predetermined schedule for the sensed engine speed.

19. A fuel control system for scheduling fuel flow to a gas turbine engine, comprising:
- means for sensing the engine temperature;
- means for decreasing the rate of fuel flow to the engine when the sensed engine temperature exceeds a predetermined value;
- speed sensing means for sensing the engine speed;
- means for increasing the rate of fuel flow in relation to increasing speed;
- mean for generating the elapsed time of a preselected portion of engine operation;
- timing means responsive to said generating means for increasing the rate of fuel flow as a function of the elapsed time signal during a selected portion of the engine operating speed range; and
- means for inhibiting said timing means to prevent the rate of fuel flow from increasing when the rate of fuel flow to the engine exceeds a predetermined value for the sensed engine speed.

20. A method of controlling the fuel flow rate to a gas turbine engine, comprising the steps of:
sensing the engine temperature;
decreasing the rate of fuel flow to the engine when the sensed engine temperature exceeds a predetermined value;
sensing the engine speed;
increasing the rate of fuel flow in relation to increasing speed;
sensing the amount of time elapsed from engine start-up; and
preventing the rate of fuel flow from increasing when the rate of fuel flow exceeds a predetermined value for the sensed engine speed.

21. A gas turbine engine fuel control system, comprising:
means for increasing the fuel flow rate to the gas turbine engine as a function of elapsed time from engine start-up;
speed sensing means for sensing engine speed;
means for producing an error signal when the fuel flow rate exceeds a predetermined rate for the sensed turbine speed; and
means responsive to said error signal for maintaining the fuel flow rate to a predetermined schedule corresponding to the sensed engine speed.

22. A gas turbine fuel control system according to claim 21 further comprising:
timing means for generating a timing signal indicative of the elapsed time from engine start-up; and
means for operating said means for increasing the fuel flow rate between a first predetermined reference speed and a second predetermined reference speed.

23. A gas turbine fuel control system according to claim 22 further including:
first reference signal means for providing a signal indicative of the first reference speed; and
first summing means having a first input connected to the output of said timing means, a second input connected to the output of said speed sensing means, and a third input connected to the output of said first reference signal means, said first summing means including means for comparing said first reference speed with the sensed engine speed to permit said timing means to operate when the sensed engine speed is at least as great as the first reference speed to increase the fuel flow rate with elapsed time, said first summing means including means for comparing the output of said speed sensing means with the output of said timing means to produce an error signal when the output of said timing means exceeds the output of said speed sensing means.

24. A gas turbine fuel control system according to claim 23 further including:
first amplifying means connected to the output of said first summing means for amplifying the error signal output therefrom; and
means connected between said timing means and said amplifier for inhibiting said timing means to prevent an increase in the fuel flow rate when the fuel flow rate exceeds a predetermined rate for the sensed turbine speed.

25. A gas turbine fuel control system according to claim 23 further including:
second reference signal means for providing a signal indicative of the second reference speed;
third reference signal means for providing a signal indicative of a third reference speed;
second summing means for comparing the sensed turbine speed with the third reference speed, said second summing means providing an output signal for increasing the fuel flow rate when the sensed turbine speed is less than the third reference speed; and
means connected to receive the output signal of said second summing means for increasing the rate of fuel flow to the gas turbine engine when the sensed turbine speed is between the second reference speed and the third reference speed.

26. A gas turbine fuel control system according to claim 24 further including:
second amplifying means for amplifying the output of said second summing means; and
clamping means for holding the output of said second amplifying means at zero when the sensed turbine speed is less than the second reference speed.

27. A gas turbine fuel control system according to claim 25 further including:
temperature sensing means for sensing the turbine inlet temperature; and
summing amplifier means for providing a fuel rate control signal in response to signals input thereto from said temperature sensing means, said first summing means, said second summing means and said speed sensing means.

28. A method for controlling the fuel flow rate to a gas turbine engine, comprising the steps of:
increasing the fuel flow rate to the gas turbine engine as a function of elapsed time from engine start-up between a first reference speed and a second reference speed;
sensing the engine speed;
producing an error signal when the fuel flow rate exceeds a predetermined rate for the sensed engine speed; and
preventing an increase in the fuel flow rate in response to the error signal until the engine speed increases to a scheduled value.

29. A system for controlling the fuel flow rate in a gas turbine engine, comprising:
means for establishing a predetermined schedule of fuel flow as a function of engine speed;
timing means for increasing the fuel flow rate as a function of time;
means for producing an error signal when the fuel flow rate deviates from said predetermined schedule; the error signal being proportional to the deviation of the fuel flow rate from said predetermined schedule; and
means, responsive to the error signal, for inhibiting said timing means when the fuel flow rate deviates from said predetermined schedule to permit the engine speed to attain a scheduled value corresponding to the fuel flow rate.

* * * * *